May 6, 1958  J. W. THROCKMORTON ET AL  2,833,269
AIR HEATER

Filed Sept. 9, 1953  2 Sheets-Sheet 1

INVENTORS
John W. Throckmorton
John S. Wallis
BY
ATTORNEY 2,833,269
Patented May 6, 1958

2,833,269
AIR HEATER

John W. Throckmorton and John S. Wallis, New York, N. Y., assignors to Petro-Chem Process Company, Incorporated, New York, N. Y., a corporation of Delaware Application September 9, 1953, Serial No. 379,264

5 Claims. (Cl. 126—109)

This invention pertains to fluid heaters and particularly relates to vertical tube radiant heaters which are primarily adapted for heating large quantities of air or other gaseous substances where low pressure drop is very important.

One object of this invention is to provide a heater capable of being built in very large sizes and adapted to heat enormous quantities of air from comparatively low temperature, such as 80° F., for example, to high temperature, such as 1500° F.

The difficulties of imparting heat to gaseous fluids are well-recognized and in meeting this severe problem we have provided a furnace in which a large number of vertical tubes are mounted in a single cylindrical bank close to the wall of the furnace. Special means are provided for insuring a distribution of flow from the inlet to the several tubes and upshot burners are provided in the bottom of the furnace so that they discharge hot flame and gases in an axial direction and impart intense heat to the tubes largely by radiation, except at the top of the furnace where the tubes are provided with radial end extensions which project inwardly to the intake manifold and absorb the remainder of the heat from the partially spent furnace gases by convection. By this means we accomplish the further object of providing a heating unit which can be built in large sizes at a moderate cost.

Other objects and advantages of this invention will appear from the detailed description and drawings of the preferred embodiment of the invention, to which reference will now be made.

Figures 1, 4, 5:
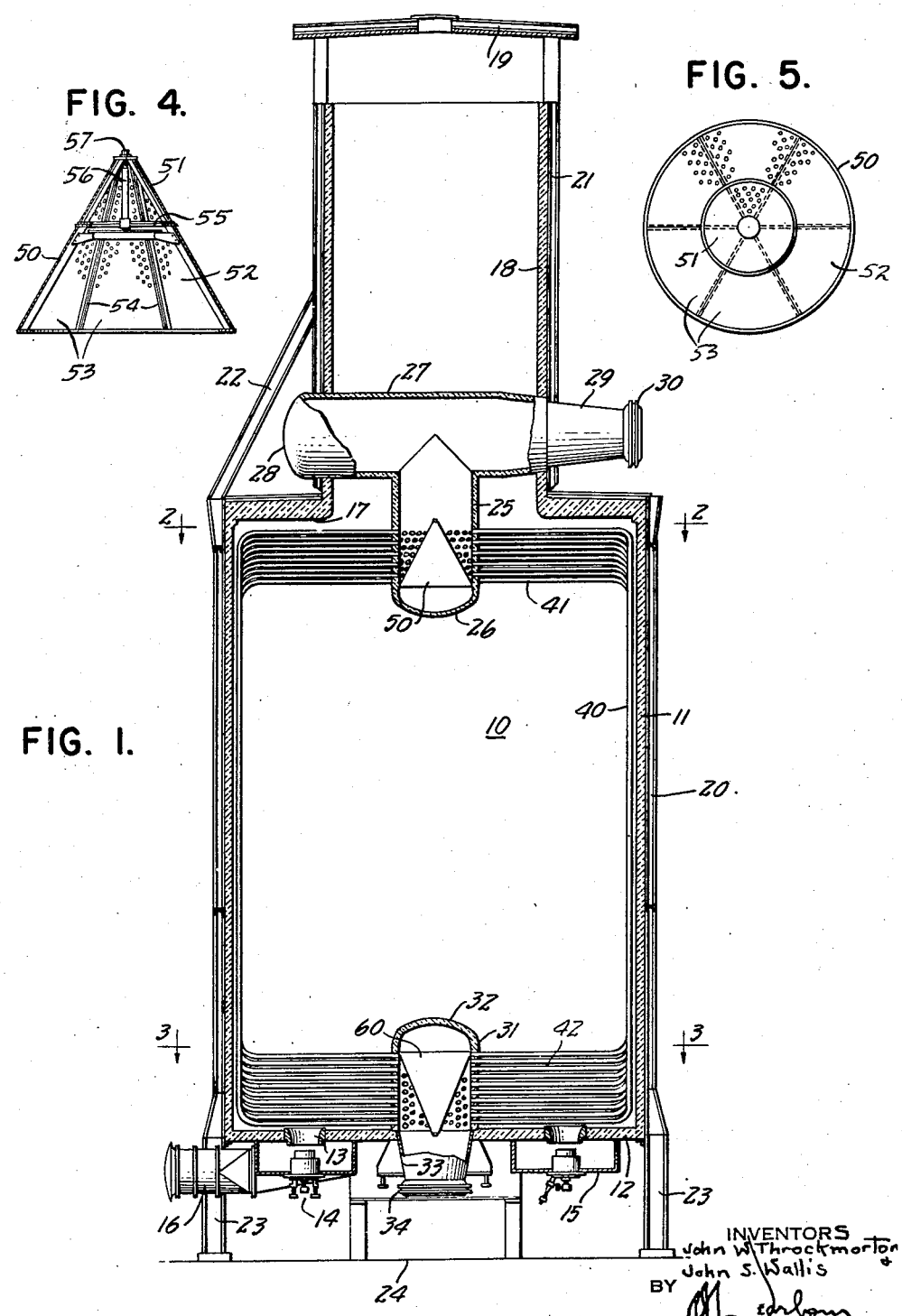
Fig. 1 is a sectional elevation of a furnace embodying our invention.
Fig. 4 is a sectional elevation.
Fig. 5 is a plan view of one of the conical baffles shown in Fig. 1.

Referring to the drawings, a cylindrical furnace 10 has insulated walls 11, which may preferably be composed of a ¼" steel shell with mono-block insulation on its inner surface and a layer of firebrick laid inside of the mono-block insulation. The bottom of the heater preferably comprises a sheet metal disc on which concrete is supported, and while the details are not shown, the bottom of the furnace (made up of the steel disc and insulation) is designated 12 and has burner outlet nozzles 13 mounted therein. A plurality of burners 14 are disposed in a circle and are mounted in an annular box 15, which is supplied with air by a motor driven blower 16. The distribution of the burners is shown in Fig. 3.

The furnace at the top is narrowed in by an arch 17 which terminates in an insulated stack 18 having a hood 19.

Figure 2:
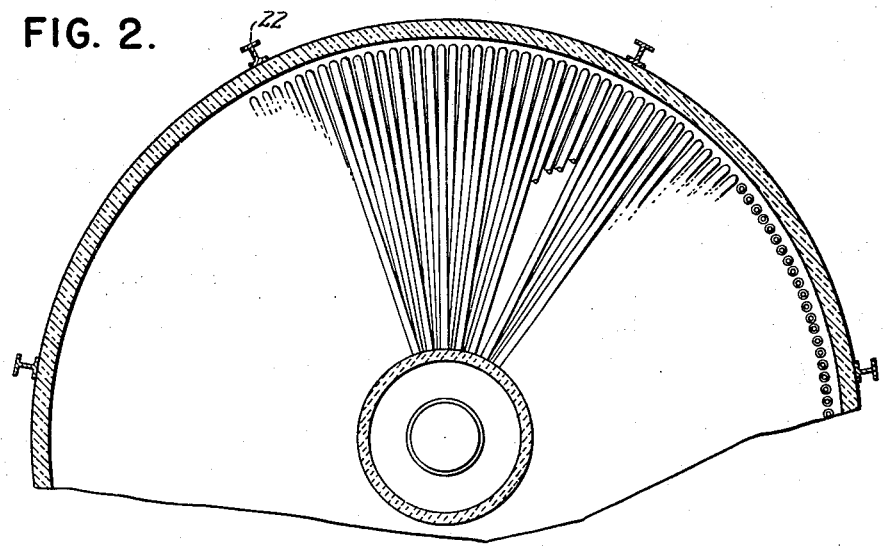
Fig. 2 is a partial sectional plan view taken on the line 2—2 of Fig. 1.
Figure 3:
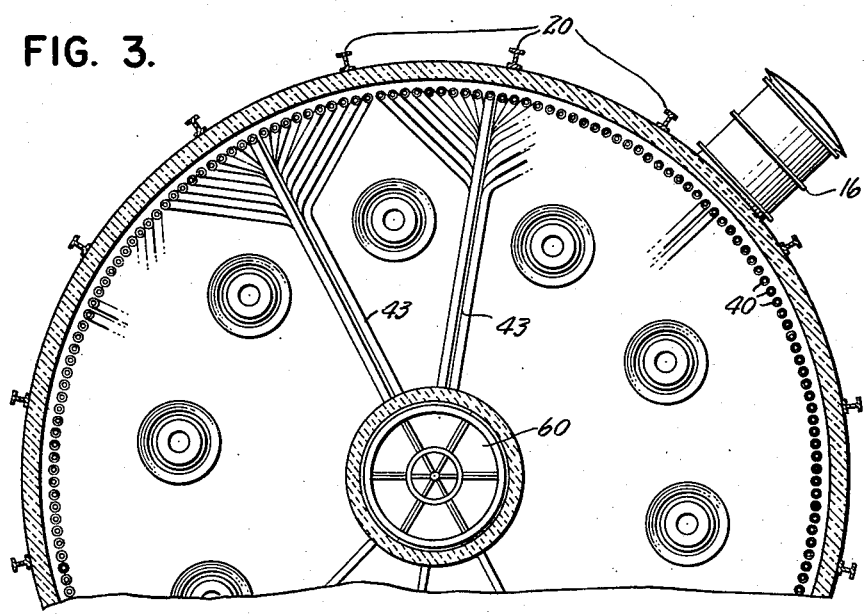
Fig. 3 is a partial sectional plan view taken on the line 3—3 of Fig. 1.

The weight of the furnace shell is carried by a plurality of I beams 20 which extend vertically and are distributed around the furnace as shown in Fig. 3. Lighter beams 21 support the stack and inclined beams 22 are distributed as shown in Fig. 2 and are welded to the top of certain of the beams 20 at the lower end and extend upwardly and inwardly so that they are welded to certain of the stack supporting beams 21. The beams 20 at the lower end terminate in legs 23 which support the entire furnace structure sufficiently above the foundation level 24 to enable men to have ready access to the burners in the furnace.

An inlet manifold 25 which is a comparatively large cylinder, with a dome-shaped head 26 at the bottom, is welded to a large cylindrical intake pipe 27 which extends transversely through the stack and is supported thereby. One end of the intake pipe has a dome-shaped end 28 and an opposite end has a tapered section 29 terminating in a joint 30 to which is connected the source of air or other gas to be heated.

The outlet manifold 31 is centrally supported in the bottom of the furnace and terminates at its upper end in a dome 32 and tapers at the bottom, as shown at 33, and terminates in a joint 34, from which hot air or other gas may be discharged into any suitable pipe or conduit.

The cylindrical section 25 of the intake manifold and the cylindrical outlet manifold 31 are preferably the same in size, are centrally located and coaxial.

A cylindrical bank of heat exchange tubes 40 is mounted close to the insulated wall of the furnace chamber, as shown in Fig. 3, and extend vertically as shown in Fig. 1. There are so many tubes and they are so close together that it is found desirable to bend them at the top to form radial tube end extensions which are arranged in spaced relation so that they will not interfere with one another and will form circumferentially extending tiers one above another as shown at 41 in Fig. 1. The tube end extensions are sealed into the intake manifold 25 by welding or otherwise.

The bottom ends of the tubes are provided with radial tube end extensions which are likewise spaced as shown at 42 in Fig. 1 but they are also bent to avoid interference with the burners as shown in Fig. 3. Thus the arrangement provides a series of tiers of tube end extensions 43 which extend radially and are sealed into the outlet manifold 31, but leave open spaces through which the burners discharge.

The flames from the burners and hot gases flow upwardly through the large open cylindrical furnace chamber in an axial direction and do not contact the tubes.

Thus the vertical tubes 40 throughout the bulk of their length are heated primarily by radiation from the furnace flame but after the flame and hot gases have given up substantial quantities of heat they pass around and among the tube end extensions 41 where they are arranged in tiers, and enter the inlet manifold. At this point the air entering the tubes is at relatively low temperature and hence the bulk of the residual heat is extracted from the hot gases before they pass into the stack.

The structure already described is clearly simple and relatively inexpensive for the size and capacity of the heater. If, however, the cool air to be heated is forced through the inlet pipe 27 and into the inlet manifold 25, the distribution of air or gas through the various tube end extensions 41 will not be uniform and the velocities will not be equalized.

Consequently we provide a conical baffle 50 which is mounted so that its base practically closes the inlet manifold just below the lowest tube connections and with the apex at the top slightly above the uppermost tube connections. In like manner a conical baffle 60 is mounted in the outlet manifold with its base mounted so as to practically close the outlet manifold just above the uppermost of the tube connections 42 and with its apex extending downward slightly below the lowermost of the tube connections 42.

These baffles are preferably built up of segments and are similar to each other. One of them is shown in detail in Figs. 4 and 5, to which reference may now be had. The cone 50 has a cone tip 51 which is made up in one piece and is mounted on a frusto-conical section 52 made up of sectors 53 which are bolted or riveted together at ribs 54. The frusto-conical section is provided with a cross brace 55 from which a central bolt 56 extends upward and is threaded at the top so that a nut 57 may be screwed in place after the cone tip 51 is mounted, as shown in Fig. 4.

The conical baffles are preferably perforated with a multiplicity of very small holes as indicated in Figs. 4 and 5 in order to prevent the collapse of the cones if unusual pressure conditions should suddenly prevail. The perforations also tend to equalize the pressure inside and outside the cone but they are small and do not in any way interfere with the action of the baffles for their primary purpose.

It will be understood that the furnace of this invention is adapted to heat large quantities of air with a minimum of pressure drop or differential from one end of the heater to the other. It is with this in view that the bends which connect the vertical tubes with the end tube extensions are made of relatively large radius as shown in Fig. 1 and the conical baffles are disposed in the manifolds so as to prevent turbulence and tend to equalize the quantity of air blowing through the various tubes.

To give a better concept of the utility of the furnace of this invention for heating air in enormous quantities, one such heater included in a commercial installation, embodying two such units, has a furnace shell with an outside diameter of more than 32 feet and a cylindrical tube bank having a diameter of 30 feet. The inside diameter of the stack is 16 feet and the overall height of the furnace, exclusive of the stack, is approximately 60 feet.

While we have shown the best embodiment of our invention known to us at present, the advantages of our invention may be incorporated in furnaces which vary in size and arrangement of parts, and we desire that no limitations be imposed other than those expressed in the appended claims.

What we claim is:

1. A fluid heater comprising a large cylindrical upstanding wall forming a furnace chamber, means forming a flue outlet at the top of said chamber, two cylindrical manifolds located coaxially of said chamber, one at the top and one at the bottom of the chamber, said manifolds being above and below an unobstructed space for high temperature fuel combustion and radiant heat transfer, a multiplicity of substantially vertical heat exchange tubes spaced, in a single-row cylindrical bank, close to the inner surface wall of the large furnace chamber and close to each other and having radial end extensions entering the manifolds in axially spaced relation so as to avoid interference betwen tube end extensions and to maintain the spacing thereof, said unobstructed space extending laterally within said chamber to the centrally exposed surfaces of said bank of tubes, a plurality of axially directed burners circumferentially spaced in the bottom of the chamber and located radially between the bottom manifold and the cylindrical tube bank, said lower radial end extensions of the heat exchange tubes being bent to form radial tiers extending axially between the burners so that an opening is formed above each burner.

2. An air heater comprising a relatively large hollow cylindrical combustion chamber having a flue outlet at its top, a cylindrical inlet manifold extending downwardly a relatively short distance into the combustion chamber and coaxial therewith, a cylindrical outlet manifold extending upwardly a relatively short distance into the combustion chamber and coaxial therewith, a large number of vertical heating tubes located within the combustion chamber close to the inner surface wall thereof and disposed in a single cylindrical bank coaxial with the combustion chamber, tube end extensions projecting radially inward from the tubes at the top and bottom, said tube end extensions being arranged in a plurality of vertically spaced circumferentially extending tiers and connected to the respective manifolds, conical baffles within the manifolds and coaxial therewith, each disposed with its base closing the manifold adjacent to the inner tube ends and with its apex opposite the outer tubes ends, whereby the air entering the inlet manifold is uniformly distributed to the various heating tubes and whereby the outlet air flows smoothly into the outlet manifold without forming air pockets.

3. An air heater comprising a relatively large hollow cylindrical combustion chamber having a flue outlet at its top, a cylindrical inlet manifold extending downwardly a relatively short distance into the combustion chamber and coaxial therewith, a cylindrical outlet manifold extending upwardly a relatively short distance into the combustion chamber and coaxial therewith, a large number of vertical heating tubes located within the combustion chamber close to the inner surface wall thereof and disposed in a single cylindrical bank coaxial with the combustion chamber, tube end extensions projecting radially inward from the tubes at the top and bottom, said tube end extensions being arranged in a plurality of vertically spaced circumferentially extending tiers and connected to the respective manifolds, conical baffles within the manifolds and coaxial therewith, each disposed with its base closing the manifold adjacent to the inner tube ends and with its apex opposite the outer tube ends, whereby the air entering the inlet manifold is uniformly distributed to the various heating tubes and whereby the outlet air flows smoothly into the outlet manifold without forming air pockets, burners in the bottom of the combustion chamber between the outlet manifold and the wall of the chamber adapted to project flame and hot gases axially upward within the combustion chamber.

4. An air heater comprising a relatively large hollow cylindrical combustion chamber having a flue outlet at its top, a cylindrical inlet manifold extending downwardly a relatively short distance into the combustion chamber and coaxial therewith, a cylindrical outlet manifold extending upwardly a relatively short distance into the combustion chamber and coaxial therewith, a large number of vertical heating tubes located within the combustion chamber close to the inner surface wall thereof and disposed in a single cylindrical bank coaxial with the combustion chamber, tube end extensions projecting radially inward from the tubes at the top and bottom, said tube end extensions being arranged in a plurality of vertically spaced circumferentially extending tiers and connected to the respective manifolds, conical baffles within the manifolds and coaxial therewith, each disposed with its base closing the manifold adjacent to the inner tube ends and with its apex opposite the outer tube ends, whereby the air entering the inlet manifold is uniformly distributed to the various heating tubes and whereby the outlet air flows smoothly into the outlet manifold without forming air pockets, burners in the bottom of the combustion chamber between the outlet manifold and the wall of the chamber adapted to project flame and hot gases axially upward within the combustion chamber, the tube end extensions at the bottom, which are connected to the outlet manifold, being bent to form openings through which the aforesaid burners discharge flame and hot gases into the combustion chamber and whereby the cylindrical bank of tubes is heated primarily by radiation and the tube end extensions at the top connected to the inlet manifold are heated primarily by convection by contact with the hot gases which have largely given up their heat by radiation to the cylindrical tube bank.

5. An air heater comprising a relatively large hollow cylindrical combustion chamber having a flue outlet at its top, a cylindrical inlet manifold extending downwardly a relatively short distance into the combustion chamber and coaxial therewith, a cylindrical outlet manifold extending upwardly a relatively short distance into the combustion chamber and coaxial therewith, a large number of vertical heating tubes located within the combustion chamber close to the inner surface wall thereof and disposed in a single cylindrical bank coaxial with the combustion chamber, tube end extensions projecting radially inward from the tubes at the top and bottom, said tube end extensions being arranged in a plurality of vertically spaced circumferentially extending tiers and connected to the respective manifolds, conical baffles within the manifolds and coaxial therewith, each disposed with its base closing the manifold adjacent to the inner tube ends and with its apex opposite the outer tube ends, whereby the air entering the inlet manifold is uniformly distributed to the various heating tubes and whereby the outlet air flows smoothly into the outlet manifold without forming air pockets, said conical baffles being uniformly perforated by very small holes to equalize pressure inside and outside of said baffles without modifying the flow of air within the manifolds.

References Cited in the file of this patent

UNITED STATES PATENTS

| | | |
|---|---|---|
| 134,879 | Geddes | Jan. 14, 1873 |
| 373,576 | Young | Nov. 22, 1887 |
| 1,125,758 | Stack | Jan. 19, 1915 |
| 1,729,641 | Pedigo | Oct. 1, 1927 |
| 2,110,430 | Swanson | Mar. 8, 1938 |
| 2,512,396 | Throckmorton | June 20, 1950 |
| 2,544,600 | Keller | Mar. 6, 1951 |
| 2,660,996 | Wasp | Dec. 1, 1953 |

FOREIGN PATENTS

| | | |
|---|---|---|
| 254,752 | Great Britain | Sept. 1, 1927 |
| 580,671 | Great Britain | Sept. 16, 1946 |
| 3,991 | Denmark | June 24, 1901 |

UNITED STATES PATENT OFFICE

CERTIFICATE OF CORRECTION

Patent No. 2,833,269                                        May 6, 1958

John W. Throckmorton et al.

It is hereby certified that error appears in the printed specification of the above numbered patent requiring correction and that the said Letters Patent should read as corrected below.

Column 2, line 15, after "dome-shaped" insert --closed--; column 3, line 59, for "betwen" read --between--; column 4, line 11, for "tubes" read --tube--.

Signed and sealed this 15th day of July 1958.

(SEAL)
Attest:
KARL H. AXLINE
Attesting Officer

ROBERT C. WATSON
Commissioner of Patents